US010174138B1

(12) United States Patent
Faust et al.

(10) Patent No.: US 10,174,138 B1
(45) Date of Patent: Jan. 8, 2019

(54) METHOD FOR FORMING HIGHLY REACTIVE OLEFIN FUNCTIONAL POLYMERS

(71) Applicants: University of Massachusetts, Boston, MA (US); Infineum International Limited, Abingdon, Oxfordshire (GB)

(72) Inventors: Rudolf Faust, Lexington, MA (US); Jacob Emert, Brooklyn, NY (US); Philip Dimitrov, Linden, MA (US); Peter Hobin, Abingdon (GB); Kyle Nesti, Abingdon (GB)

(73) Assignees: University of Massachusetts, Boston, MA (US); Infineum International Limited, Abingdon, Oxfordshire (GB)

( * ) Notice: Subject to any disclaimer, the term of this patent is extended or adjusted under 35 U.S.C. 154(b) by 0 days.

(21) Appl. No.: 15/880,145

(22) Filed: Jan. 25, 2018

(51) Int. Cl.
C08F 10/10 (2006.01)

(52) U.S. Cl.
CPC .................................. C08F 10/10 (2013.01)

(58) Field of Classification Search
CPC .. C08F 110/10; C08F 4/14; C08F 4/22; C08F 2500/02; C08F 2500/03; C08F 2500/04
USPC .................................. 526/90, 210, 237, 348
See application file for complete search history.

(56) References Cited

U.S. PATENT DOCUMENTS

| | | | |
|---|---|---|---|
| 2,682,531 A | 6/1954 | Ernst et al. | |
| 3,846,392 A | 11/1974 | Matsumara et al. | |
| 3,850,897 A | 11/1974 | Priola et al. | |
| 5,254,649 A | 10/1993 | Miln et al. | |
| 5,408,018 A | 4/1995 | Rath | |
| 5,663,470 A | 9/1997 | Chen et al. | |
| 5,710,225 A | 1/1998 | Johnson et al. | |
| 5,789,335 A | 8/1998 | Chen et al. | |
| 6,211,312 B1 | 4/2001 | Holtcamp | |
| 6,346,585 B1 | 2/2002 | Johnson et al. | |
| 6,407,170 B1 | 6/2002 | Johnson et al. | |
| 6,407,186 B1 | 6/2002 | Rath et al. | |
| 6,441,110 B1 | 8/2002 | Sigwart et al. | |
| 6,562,913 B1 | 5/2003 | Baxter, Jr. et al. | |
| 6,683,138 B2 | 1/2004 | Baxter, Jr. et al. | |
| 6,753,389 B1 | 6/2004 | Rath et al. | |
| 6,846,903 B2 | 1/2005 | Wettling et al. | |
| 6,939,943 B2 | 9/2005 | Wettling et al. | |
| 7,038,008 B2 | 5/2006 | Wettling et al. | |
| 7,217,773 B2 | 5/2007 | Rath et al. | |
| 7,291,758 B2 | 11/2007 | Bohnenpoll et al. | |
| 7,683,194 B2 | 3/2010 | Krossing et al. | |
| 8,349,977 B2 | 1/2013 | Koenig et al. | |
| 8,637,619 B2 | 1/2014 | Koenig et al. | |
| 8,697,820 B2 | 1/2014 | Koenig et al. | |
| 9,034,998 B2 * | 5/2015 | Faust .................... | C08F 110/10 526/210 |
| 9,156,924 B2 | 10/2015 | Faust et al. | |
| 9,631,038 B2 | 4/2017 | Faust et al. | |
| 9,771,442 B2 | 9/2017 | Faust et al. | |
| 2004/0059076 A1 | 3/2004 | Webb et al. | |
| 2008/0293900 A1 | 11/2008 | Hanefeld et al. | |
| 2009/0318624 A1 | 12/2009 | Storey et al. | |
| 2011/0201772 A1 | 8/2011 | Koenig et al. | |
| 2012/0165473 A1 | 6/2012 | Koenig et al. | |
| 2013/0158217 A1 | 6/2013 | Faust et al. | |
| 2014/0275453 A1 | 9/2014 | Emert et al. | |
| 2015/0105525 A1 | 4/2015 | Faust et al. | |
| 2016/0333123 A1 | 11/2016 | Faust et al. | |

FOREIGN PATENT DOCUMENTS

| | | |
|---|---|---|
| CN | 1753918 A | 3/2006 |
| CN | 101613423 B | 12/2009 |
| CN | 101955558 * | 1/2011 |
| CN | 102007149 A | 4/2011 |
| CN | 102046671 A | 5/2011 |
| CN | 102137875 A | 7/2011 |
| EP | 0 436 775 | 7/1991 |
| EP | 0 489 508 | 6/1992 |
| EP | 2 604 635 | 6/2013 |
| EP | 2 860 206 A1 | 4/2015 |
| JP | 3-203917 B2 | 6/1995 |
| JP | 48-60784 | 1/2012 |
| JP | 6285221 | 2/2018 |
| WO | WO 94/19380 | 9/1994 |
| WO | WO 99/07753 | 2/1999 |
| WO | WO 2002/048216 A2 | 6/2002 |
| WO | WO 2004/014968 A2 | 2/2004 |
| WO | WO 2004/058828 | 7/2004 |
| WO | WO 2006/074211 | 7/2006 |
| WO | WO 2008/095933 | 8/2008 |
| WO | WO 2009/120551 | 10/2009 |
| WO | WO 2010/008890 A2 | 1/2010 |
| WO | WO 2010/139684 | 12/2010 |
| WO | WO 2011/054785 | 5/2011 |
| WO | WO 2013/021058 A1 | 2/2013 |
| WO | WO 2013/090764 | 6/2013 |

OTHER PUBLICATIONS

Bartelson, K.J., et al., "Cationic Polymerization of Isobutylene by FeCl3/Ether Complexes in Hexanes: An Investigation of the Steric and Electronic Effects of Ethers," Polymer, 54(18): 4858-4863 (Jul. 2013).

(Continued)

Primary Examiner — William K Cheung
(74) Attorney, Agent, or Firm — Hamilton, Brook, Smith & Reynolds, P.C.

(57) ABSTRACT

An improved process for the preparation of polybutene having an exo-olefin content of at least 50 mol. % by the polymerization of iso-butene, or a $C_4$ feed containing iso-butene and other $C_4$ olefins using (i) a Lewis acid.Lewis base catalyst complex and an alkyl halide initiator, in a substantially or completely apolar polymerization medium, in the presence of a hindered alcohol or alkoxyaluminum dichloride. In the above polymerization reaction, it has been found that a hindered alcohol or hindered alkoxyaluminum dichloride will function as an "exo enhancer" resulting in high isobutene conversion and the production of a polybutene product having a high terminal vinylidene content, while maintaining a target molecular weight.

26 Claims, No Drawings

(56) References Cited

OTHER PUBLICATIONS

Kennedy et al., "New Telechelic Polymers and Sequential Copolymers by Polyfunctional Initiator-Transfer Agents (Inifers)," *Polymer Bulletin (1)*, pp. 575-580 (1979).

Kostjuk, S.V., "Recent Progress in the Lewis Acid Co-Initiated Cationic Polymerization of Isobutylene and 1,3-dienes," Royal Society of Chemistry, 5(17): 13125-13144 (Jan. 2015).

Kumar, R., et al., "Synthesis of Highly Reactive Polyisobutylene With FeCl3/Ether Complexes in Hexane; Kinetic and Mechanistic Studies," Polymer Chemistry, 6(2): 322-329 (Jan. 2015).

Liu et al., "A cost-effective process for highly reactive polyisobutylenes via cationic polymerization coinitiated by AlCl3," *Polymer (51)*, pp. 5960-5969 (2010).

Morgan et al., "Sulfonium Ion Adducts from Quasiliving Polyisobutylene and Mono- or Disulfides,"*Macromolecules (42)*, pp. 2344-2352 (2009).

Nielsen et al., "Synthesis of Isobutenyl-telechelic polyisobutylene by functionalization with isobutenyltrimethylsilane," *Polymer (38)(No. 10)*, pp. 2529-2534 (1997).

Shiman, D.I. et al., "Cationic Polymerization of Isobutylene by AlCl3/ether Complexes in Non-Polar Solvents: Effect of Ether Structure on the Selectivity of β-H Elimination," Polymer, 54: 2235-2242 (2013).

Simison et al., "End-Quenching of Quasiliving Carbocationic Isobutylene Polymerization with Hindered Bases: Quantitative Formation of exo-Olefin-Terminated Polyisobutylene," *Macromolecules (39)*, pp. 2481-2487 (2006).

Vasilenko et al., "Cationic Polymerization of Isobutylene Using AlCl3Bu2 as a Coinitiator: Synthesis of Highly Reactive Polyisobutylene," *Macromolecules (43)*, pp. 5503-5507 (2010).

\* cited by examiner

METHOD FOR FORMING HIGHLY REACTIVE OLEFIN FUNCTIONAL POLYMERS

BACKGROUND

Dispersants based on polybutene succinimides are ubiquitous in lubricating oils worldwide. An essential step in the manufacture of these dispersants is maleation of polybutene to polybutene succinic anhydride, which is further aminated with a polyamine to produce the succinimide. The maleation process is facilitated by polyisobutylene (PIB) with a high level of vinylidene at the polymer terminus, which can react smoothly with maleic anhydride in a thermal or "ene", without the need for chlorine as a facilitator. Such polymers, termed highly reactive PIB or HR-PIB, are preferred in industry for their process, performance and environmental benefits.

Existing processes to manufacture HR-PIB via cationic polymerization of isobutylene (IB) utilize a $BF_3$ catalyst associated with a range of alcohols and/or ethers often requiring pure IB feed, very low temperatures, and fluorine clean-up steps (Mach et al. Lubr. Sci. 1999 11(2) 175-185). Such processes can be costly in terms of both equipment and operations. More recently, catalysts based on $AlCl_3$ or alkyl $AlCl_2$ Lewis acids (LA) complexed with ether Lewis bases (LB) have shown the capability to produce HR-PIB in the presence of alkyl halide initiators (see review by Kostjuk, RSC Adv., 2015, 5, 13125-13144). The Lewis acid ionizes the initiator to start polymerization, and the Lewis base deprotonates the polymeric carbenium to the desired olefin. The binding strength of the LA.LB complex is dependent on the nature of LA and LB as well as on the environment. In a relatively polar medium such as dichloromethane (DCM), a Lewis acid.Lewis base complex of $EtAlCl_2$ (EADC) and di-isopropyl ether is able to produce HR-PIB with high vinylidene levels. However, in the apolar, all hydrocarbon environment of a $C_4$ polymerization reactor, the above complex is too strong and the Lewis acid is unable to ionize t-butyl chloride (t-BuCl), a common initiator used to start polymerization of IB.

Adjustment of the complexation energetics via introduction of electron withdrawing groups into the Lewis base as in bis-(2-chloroethyl) ether (CEE), results in efficient ionization of t-BuCl and initiation of IB polymerization even in apolar media, while still maintaining high vinylidene content (U.S. Pat. No. 9,156,924). The amount of reactive vinylidene olefin (exo olefin) produced is dependent on the rate of deprotonation of the polymeric carbenium ion relative to the rate of isomerization to more hindered ions that lead to less reactive olefins. Therefore, a high concentration of the CEE deprotonation agent is normally used to maximize the vinylidene content (e.g. 1.5-3 times the LA concentration).

A high concentration of CEE, however, can decrease the rate of IB polymerization because it inhibits dissociation of the LA.CEE complex which dissociation is required to ionize the t-BuCl initiator. Long residence times and large reactors would then be required to realize commercially reasonable monomer conversions. The high rate of deprotonation also lowers the molecular weight (MW) of the polymer product because it interrupts chain growth. Therefore, a means to simultaneously achieve high terminal vinylidene, high monomer conversion and high MW simultaneously using aluminum based catalysts at reasonable temperatures would be very valuable to the industry.

U.S. Pat. No. 7,411,104 teaches the addition of tertiary alcohols such as t-butanol in combination with a secondary alkyl ether, such as di-isopropyl ether, during the polymerization of IB using a $BF_3$ catalyst to enhance the vinylidene content of the resulting HR-PIB polymer. This type of ether does not work with an aluminum based system, however, because the Lewis acid-Lewis base complex is too strong and polymerization is impeded (Macromolecules 2014, 47, 1959-1965). U.S. Pat. No. 7,411,104 further teaches that the ratio of secondary alkyl ether to tertiary alcohol used in that process must be in the range of 0.5-1.2 and if the mole ratio is "less or more than the above-mentioned range, the content of the terminal vinylidene decreases, and the advantageous effect of the present invention cannot be achieved". In an aluminum-based system, however, such a large amount of tertiary alcohol would act as a poison, reducing conversion to low and commercially impractical levels.

SUMMARY

The invention is directed to an improved process for the preparation of polybutene having an exo-olefin content of at least 50 mol. % by the polymerization of iso-butene, or a $C_4$ feed comprising iso-butene and other $C_4$ olefins using (i) a Lewis acid.Lewis base catalyst complex and an initiator capable of initiating cationic polymerization, in a substantially or completely apolar polymerization medium, in the presence of a hindered alcohol or alkoxyaluminum dichloride.

More specifically, in one embodiment, the invention is a process for the preparation of polybutene having an exo-olefin content of at least 50 mol. %, which process comprises contacting said isobutene or isobutene-containing feedstock with a Lewis acid catalyst complexed with a Lewis base, in a substantially or completely apolar polymerization medium, and initiating polymerization of said isobutene or isobutene-containing feedstock with an initiator, wherein said Lewis acid catalyst is a Lewis acid of the formula $R'AlCl_2$, wherein R' is a hydrocarbyl group; said Lewis base is a dihydrocarbyl ether wherein each hydrocarbyl group is independently selected from hydrocarbyl groups having 1 to 8 carbon atoms and one or both hydrocarbyl groups of the dihydrocarbyl ether are substituted with an electron withdrawing group, and the initiator is a compound of the formulae OR, OCOR, or HX, wherein R comprises a hydrocarbyl group and X is a halide or a compound of the formula RX, wherein X is a halide, R comprises a hydrocarbyl group capable of forming a stable carbocation and the carbon linking group R to X is tertiary, benzylic or allylic; wherein polymerization is conducted in the presence of a hindered alcohol or hindered alkoxyaluminum dichloride.

In the above polymerization reaction, it has been found that, surprisingly, a hindered alcohol or alkoxyaluminum dichloride will function as an "exo enhancer" resulting in high isobutene conversion and the production of a polybutene product having a high terminal vinylidene content, while maintaining a target molecular weight.

It has been discovered that, surprisingly, in a polymerization process for the preparation of polybutene by polymerization of iso-butene, or a $C_4$ feed comprising iso-butene and other $C_4$ olefins using $AlCl_3$ or alkyl $AlCl_2$ Lewis acids (LA) complexed with ether Lewis bases having an electron-withdrawing group (LB) as the catalyst and an alkyl halide initiator, in a substantially or completely apolar polymerization medium, the presence of a tertiary alcohol, when used in relatively small amounts, will increase the terminal vinylidene content of the resulting polybutene product without causing a corresponding reduction in molecular weight.

DETAILED DESCRIPTION

A description of example embodiments follows.

Lewis acids useful in the practice of the present invention include Lewis acids of the formula R'AlCl$_2$, wherein R' is a hydrocarbyl group, preferably a hydrocarbyl group having 1 to 12 carbon atoms, more preferably an alkyl group having 1 to 12 carbons. As used herein, the term "hydrocarbyl" means a chemical group of a compound that contains hydrogen and carbon atoms and that are bonded to the remainder of the compound directly via a carbon atom. The group may contain one or more atoms other than carbon and hydrogen ("hetero atoms"), provided such hetero atoms do not affect the essentially hydrocarbyl nature of the group.

Useful Lewis bases are dihydrocarbyl ethers wherein each hydrocarbyl group is independently selected from hydrocarbyl groups having 1 to 8 carbon atoms. The hydrocarbyl groups of the ether may be branched, straight-chained or cyclic. Where the hydrocarbyl groups of the ether are branched or straight-chained, the hydrocarbyl groups are preferably alkyl groups, more preferably alkyl groups having 1 to 4 carbon atoms. One or both hydrocarbyl groups of the dihydrocarbyl ether are substituted with an electron withdrawing group. The presence of the electron withdrawing group(s) weakens the association between the Lewis base and the Lewis acid, resulting in improved ionization of the initiator. The electron withdrawing effect cannot be too large, however because sufficient basicity must be retained to rapidly deprotonate carbenium ions prior to isomerization. The electron withdrawing group(s) is preferably a halogen atom, preferably a chlorine atom. Preferably, the halogen atom is at the 2-position of the hydrocarbyl group(s).

The Lewis acid and Lewis base can be added to the polymerization medium separately (prior to monomer addition) and allowed to form a complex in situ, or can be added as a complex formed by, for example, dissolving the Lewis acid in a solvent to form a solution and then adding the Lewis base to the solution, while the solution is stirred. The solvent may be polar or apolar. Preferably, the solvent is selected from liquid, apolar, non-halogenated aliphatic or alicyclic solvent, and liquid aromatic solvents (e.g., benzene, chlorobenzene, toluene and xylene). Particularly, the solvent is a non-halogenated aliphatic or alicyclic solvent, such as hexanes or a mixed saturated aliphatic or alicyclic hydrocarbon solvent (ISOPAR). When the Lewis acid and Lewis Base are complexed in xylene or toluene, it is preferable to dissolve the Lewis base in the xylene or toluene solvent to form a solution, and then add the Lewis acid to the Lewis base solution, while the solution is stirred. The complex may be added to the polymerization medium with the solvent; alternatively, the solvent may be removed prior to the addition of the complex to the polymerization medium.

The molar ratio of Lewis acid to Lewis base in the complex will typically be maintained within a range of from about 0.9:1 to about 1:8, preferably from about 0.9:1 to about 1:6, more preferably from about 0.9:1 to about 1:3, such as about 0.9:1 to about 1:2; most preferably 0.9:1 to 1:1.2.

An "initiator" is defined as a compound that can initiate cationic polymerization, in the presence or absence of adventitious water and in the presence of a proton trap. Initiators useful in the practice of the present invention include initiators of the formulae OR, OCOR, HX, wherein R comprises a hydrocarbyl group, preferably an alkyl or aryl-alkyl group and X is a halide, preferably chlorine; and RX, wherein X is a halide, preferably chlorine, and R comprises a hydrocarbyl group, preferably an alkyl or aryl-alkyl group, wherein the carbon linking group R to X is tertiary, benzylic or allylic, preferably tertiary, which hydrocarbyl group is capable of forming a stable carbocation (e.g., t-butyl$^+$).

The polymerization medium is preferably a substantially or completely apolar polymerization medium, such as a mixture of saturated and unsaturated C$_4$ hydrocarbons. The polymerization could be carried out in a typical mixed C$_4$ feed as the polymerization medium without separation of the IB or addition of polar solvents.

The hindered alcohol of the present invention is preferably a tertiary alcohol, most preferably, t-butanol. Tertiary alcohols other than t-butanol, such as t-amyl alcohol and 3-ethyl 3-pentanol can also be used however performance may deteriorate somewhat with increased steric hindrance. Tertiary aromatic alcohols such as cumyl alcohols are prone to undergo a side reaction and are preferably avoided.

The hindered alcohol surprisingly enhances vinylidene content without reducing molecular weight. This is unexpected since faster deprotonation to increase vinylidene would normally reduce molecular weight. The enhanced vinylidene in turn allows the Lewis acid-Lewis base ratio to be close to stoichiometric, thereby further increasing monomer conversion and molecular weight. Excessive hindered alcohol should not be used because it inhibits polymerization. Therefore, from about 0.05 to about 3 mM hindered alcohol (corresponding to about 0.5 to about 30% of the Lewis acid.Lewis base complex concentration) is preferred. The hindered alcohol can be introduced at −5 to 10° C. (e.g. 0° C.) to minimize side reactions.

Observation has suggested that the "exo enhancer" is actually a tert-alkoxyaluminum dichloride that is the in situ reaction product of the Lewis acid and the hindered alcohol (e.g. t-BuOAlCl$_2$, which is formed in situ in the reaction between t-butanol and ethyl aluminum dichloride (EADC)). Tert-alkoxyaluminum dichloride decomposes slowly at room temperature; however, it is sufficiently stable at lower temperatures (eg. for at least 1 h at 5° C.) that it can be pre-formed and used directly. A pre-formed, hindered alkoxyaluminum dichloride may be used in place of the hindered alcohol and, when a pre-formed hindered alkoxyaluminum dichloride is used, higher concentrations (up to 10 mM) can be used before conversion deteriorates.

In the polymerization process of the present invention, the feedstock may be pure isobutylene or a mixed C$_4$ hydrocarbyl feedstock containing isobutylene, such as a C$_4$ cut resulting from the thermal or catalytic cracking operation of, for example, naphtha. Thus, suitable feedstocks will typically contain at least 10%, and up to 100% isobutylene, by mass (e.g. 20-50%, based on the total mass of the feed. In addition to isobutylene, conventional C$_4$ cuts suitable for use as feedstocks that are of industrial importance typically will contain between about 5% and about 50% butene-1, between about 2% and about 40% butene-2, between about 2% and about 60% iso-butane, between about 2% and about 20% n-butane, and up to about 0.5% butadiene, all percentages being by mass, based on the total feed mass. Feedstocks containing isobutylene may also contain other non-C$_4$ polymerizable olefin monomers in minor amounts, e.g., typically less than 10%, preferably less than about 5%, and most preferably less than 1%, such as propadiene, propylene and C$_5$ olefins.

The term "polybutene", as employed herein is intended to include not only homopolymers of isobutylene, but also copolymers of isobutylene and one or more other $C_4$ polymerizable monomers of conventional $C_4$ cuts as well as non-$C_4$ ethylenically unsaturated olefin monomers containing 5 carbon atoms, provided such copolymers contain typically at least 50 mass %, preferably at least 65 mass %, and most preferably at least 80 mass % isobutylene units, based on the polymer number average molecular weight ($\overline{M}_n$).

The amount of the Lewis acid-Lewis base complex employed in the process of the present invention can be controlled, in conjunction with the concentration of initiator and monomer, reaction time and temperature, to achieve the target $\overline{M}_n$ of the polybutene polymer product, the conversion of butene and yield of polybutene. In view of the above, the Lewis acid.Lewis base complex is typically employed in an amount sufficient to contact the butene monomer in a liquid phase reaction mixture at a concentration of millimoles of Lewis acid.Lewis base complex per liter of reaction mixture of from about 0.2 mM to about 200 mM, such as from about 1 mM to about 200 mM, preferably from about 5 mM to about 100 mM, and more preferably from about 10 mM to about 50 mM, e.g., 10 mM to 30 mM per liter of feedstock.

The initiator will typically be employed in an amount sufficient to contact the butene monomer in a liquid phase reaction mixture at a concentration of millimoles of initiator per liter of medium, and independent from the amount of Lewis acid.Lewis base complex, of from about 1 mM to about 200 mM, preferably from about 5 mM to about 100 mM, and more preferably from about 10 mM to about 50 mM, such as about 10 mM to about 30 mM per liter of feedstock.

The polymerization reaction can be performed as a batch or continuous process. On an industrial scale, the polymerization reaction is preferably conducted continuously. The continuous process can be carried out in tubular reactors, tube-bundle reactors or loop reactors, or tube or tube-bundle reactors with continuous circulation of the reaction material, or in a stirred tank reactor (glass, carbon steel or Monel preferred).

The polymerization reaction is conducted in the liquid phase to induce linear or chain-type polymerization, as opposed to ring or branch formation. Thus, if a feed is used that is gaseous under ambient temperature, it is preferred to control the reaction pressure and/or dissolve the feed in an inert solvent or liquid diluent, in order to maintain the feed in the liquid phase. Typical $C_4$ cuts comprising the feed are liquid under pressure and do not require a solvent or diluent. Typical diluents suitable for use with the process include $C_3$ to $C_6$ alkanes, such as propane, butane, pentane and isobutane.

The Lewis acid.Lewis base complex is typically introduced into the reactor as a liquid partially or completely dissolved in a solvent, or as a solid. Polymerization is preferably conducted at a pressure sufficient to maintain the $C_4$ feed in a liquid state at the reaction temperature, or at higher pressures. The initiator and hindered alcohol (or tert-alkoxyaluminum dichloride) may be introduced to the monomer feed or the reaction mixture in liquid form together with the Lewis acid.Lewis base complex or, preferably, is introduced to the monomer feed or the reaction mixture in liquid form by a line, or lines, separate from the Lewis acid.Lewis base complex addition line.

The liquid phase reaction mixture temperature is controlled by conventional means to be typically from about −30° C. to about +50° C., preferably from about −10° C. to about +30° C., more preferably from about −5° C. to about +20° C., such as about 0° C. to about +15° C. to minimize refrigeration costs and unwanted side reactions.

In order to insure even distribution of the catalyst within the reactor, turbulent flow of the reactor contents (Reynolds number >100, preferably >1000) can be generated by mixing, or with suitable baffles, such as baffle plates or oscillating baffles, or by dimensioning the reactor tube cross sections so that a suitable flow velocity is established.

The steady state residence time of the butene to be polymerized may be from about 1 to about 300 minutes, such as 2 to about 120 minutes, preferably from about 4 to about 60 minutes or from about 5 to about 45 minutes (e.g., from about 6 to about 30 minutes).

The process of the present invention is typically conducted in a manner achieving an isobutylene conversion in the range of from about 20% up to about 100%, preferably from about 50% to about 100%, and more preferably from about 70% to about 100%, such as 80% to 100%, 90% to 100% or 95% to 100%. The combined use of temperature control and catalyst feed rate permits formation of polybutenes having a $\overline{M}_n$ of from about 400 Daltons to about 4000 Daltons, preferably from about 700 Daltons to about 3000 Daltons, more preferably from about 1000 Daltons to about 2500 Daltons; a molecular weight distribution (MWD) of typically from about 1.1 to about 4.0, preferably from about 1.5 to about 3.0, an exo-olefin content of greater than 50 mol. %, preferably greater than 60 mol. %, more preferably greater than 70 mol. %, such as from about 80 mol. % to about 95 mol. %; a tetra-substituted olefin content of less than about 20 mol. %, such as less than about 15 mol. %, preferably less than about 10 mol. %, more preferably less than about 5 mol. %; and a chlorine content of less than about 10 mol. %, such as less than about 5 mol. %, preferably less than about 2 mol. %, more preferably less than about 1 mol. % based on the total moles of polymer.

Once the target molecular weight of the polymer is achieved, the polymer product can be discharged from the reactor and passed into a medium that deactivates the polymerization catalyst and terminates the polymerization. Suitable deactivation media include water, amines, alcohols and caustics. The polyisobutylene product can then be separated by distilling off the remaining $C_4$ hydrocarbons and low molecular weight oligomers. Preferably residual amounts of catalyst are removed, usually by washing with water or caustic.

In one commercially preferred embodiment (from a standpoint of performance, environmental impact and cost), the Lewis acid is R'AlCl$_2$, wherein R' is $C_1$ to $C_4$ hydrocarbyl, specifically, MeAlCl$_2$, EtAlCl$_2$ (EADC), iso-BuAlCl$_2$ or n-BuAlCl$_2$, the Lewis base is a chlorinated dihydrocarbyl ether (CEE), the solvent is ISOPAR or toluene, the complex is formed by dissolving the Lewis base in the solvent to form a solution and then adding the Lewis acid to the Lewis base solution in an amount such that the molar ratio of Lewis acid to Lewis base in the complex is from about 1:1 to about 1:1.5; and the "exo-enhancer" is t-butyl alcohol or t-BuOAlCl$_2$.

This invention will be further understood by reference to the following examples, which are not intended, and should not be construed as listing all possible embodiments within the scope of the invention.

EXAMPLES

EADC.CEE complexes were prepared just before polymerization of IB. In a glovebox, the required amount of ether was added to EADC in hexanes and stirred to form a Lewis acid/ether complex, followed by the addition of an amount of hexanes required to make the fully soluble 0.1 M complexes. Polymerizations were performed under a dry $N_2$ atmosphere in an MBraun glovebox (MBraun, Inc. Stratham, N.H.). Typically, the required amount of hexanes was placed in the polymerization reactors, screw top culture tubes (75 mL), at −30° C. Then, the initiator (t-BuCl) was added to the reactors, followed by addition of t-butanol (Table 1) or t-BuOAlCl$_2$ (Table 2). IB was condensed and distributed to the polymerization reactors containing t-BuCl, t-butanol or t-BuOAlCl$_2$, and hexanes. The polymerizations were started by adding EADC.CEE complex to the reactors at the polymerization temperature and terminated with either ammonium hydroxide (NH$_4$OH) or methanol. Resulting polymer was analyzed as described in *Macromolecules*, 2014, 47 (6), pp 1959-1965.

TABLE 1

Polymerization of IB in dry hexanes at 0° C. in the absence and presence of t-butanol with [CEE]•[EADC] = 1

| Time (min) | [t-BuOH] (mM) | Conv (%) | $M_{n,NMR}$ (g/mol) | $M_{n,SEC}$ (g/mol) | PDI | Exo (%) | Tri+ Endo (%) | Tetra (%) |
|---|---|---|---|---|---|---|---|---|
| 20 | 0 | 100 | 2400 | 2500 | 3.3 | 68 | 20 | 12 |
| 20 | 0.01 | 100 | 2300 | 2100 | 3.4 | 77 | 15 | 08 |
| 20 | 0.3 | 96 | 2300 | 2200 | 3.2 | 83 | 08 | 09 |
| 60 | 0.3 | 100 | 1800 | 2000 | 3.3 | 82 | 11 | 07 |
| 20 | 1.0 | 76 | 1900 | 1800 | 3.4 | 84 | 08 | 08 |
| 60 | 1.0 | 100 | 1400 | 1200 | 3.2 | 86 | 08 | 06 |
| 60 | 2.0 | 75 | 2000 | 1800 | 3.3 | 90 | 05 | 05 |
| 60 | 5.0 | 12 | 1800 | 1900 | 3.1 | 96 | 03 | 01 |

[IB] = 1M, [t-BuCl] = 0.01M, [EADC•CEE] = 0.01M, reaction volume = 10 mL

TABLE 2

Polymerization of IB with EADC•CEE in dry hexanes at 0° C. with [CEE]•[EADC] = 1.0 in the presence of pre-formed t-BuOAlCl$_2$

| Time (min) | [t-BuOAlCl$_2$] (mM) | Conv. (%) | $M_{n,NMR}$ (g/mol) | $M_{n,SEC}$ (g/mol) | PDI | Exo (%) | Tri+ Endo (%) | Tetra (%) |
|---|---|---|---|---|---|---|---|---|
| 20 | 0.3 | 100 | 3000 | 3100 | 2.9 | 82 | 10 | 08 |
| 60 | 0.3 | 100 | 2800 | 3000 | 3.1 | 84 | 10 | 06 |
| 20 | 1.0 | 90 | 3100 | 3300 | 3.2 | 84 | 08 | 08 |
| 60 | 1.0 | 100 | 2800 | 3000 | 3.0 | 85 | 08 | 07 |
| 20 | 2.0 | 80 | 2900 | 3200 | 3.3 | 85 | 09 | 06 |
| 60 | 2.0 | 96 | 2600 | 2900 | 3.2 | 86 | 07 | 07 |
| 20 | 5.0 | 71 | 2700 | 2800 | 3.0 | 87 | 09 | 04 |
| 60 | 5.0 | 94 | 2200 | 2300 | 2.9 | 89 | 08 | 03 |

[IB] = 1M, [t-BuCl] = 0.01M, [EADC•CEE] = 0.01M, reaction volume = 10 mL
Addition Sequence: Hexanes + IB + t-BuCl + t-BuOAlCl$_2$ (0° C.) + EADC•CEE While certain representative embodiments and details have been provided to illustrate the invention, it will be apparent to the skilled artisan that various product and process changes from those disclosed herein may be made without departing from the scope of the present invention. The appended claims define the scope of the invention All cited patents, test procedures, priority documents, and other cited documents are fully incorporated by reference to the extent that such material is consistent with this specification and for all jurisdictions in which such incorporation by reference is permitted.

Certain features of the present invention are described in terms of a set of numerical upper limits and a set of numerical lower limits. This specification discloses all ranges formed by any combination of these limits. It is to be understood that the upper limits and lower limits, as well as range and ratio limits set forth herein may be independently combined, and that all combinations of these limits are within the scope of the invention unless otherwise indicated.

What is claimed is:

1. A process for preparing polybutene having an exo-olefin content of at least 50 mol. %, the process comprising contacting isobutene or isobutene-containing feedstock with a Lewis acid catalyst complexed with a Lewis base, in a substantially or completely apolar polymerization medium, and initiating polymerization of said isobutene or isobutene-containing feedstock with an initiator;
   wherein said Lewis acid catalyst is a Lewis acid of the formula R'AlCl$_2$, wherein R' is a hydrocarbyl group;
   wherein said Lewis base is a dihydrocarbyl ether wherein each hydrocarbyl group is independently selected from hydrocarbyl groups having 1 to 8 carbon atoms and one or both hydrocarbyl groups of the dihydrocarbyl ether are substituted with an electron withdrawing group;
   wherein the initiator is a compound of the formula RX, wherein X is a halide, R is a hydrocarbyl group capable of forming a stable carbocation, and R is linked to X by a carbon that is tertiary, benzylic or allylic; and
   wherein polymerization is conducted in the presence of a hindered alcohol or hindered alkoxyaluminum dichloride.

2. The process of claim 1, wherein R' is an alkyl group having 1 to 12 carbons.

3. The process of claim 1, wherein said Lewis base is dihydrocarbyl ether wherein each hydrocarbyl group is independently selected from alkyl groups having 1 to 4 carbon atoms.

4. The process of claim 1, wherein one or both hydrocarbyl groups of said dihydrocarbyl ether Lewis base are substituted with a chlorine atom.

5. The process of claim 3, wherein one or both hydrocarbyl groups of said dihydrocarbyl ether Lewis base are substituted with a chlorine atom.

6. The process of claim 1, wherein the Lewis acid and Lewis base are complexed in a solvent selected from liquid, apolar, non-halogenated aliphatic solvents and liquid, aromatic solvents.

7. The process of claim 6, wherein said solvent is hexanes or mixed, saturated aliphatic or alicyclic hydrocarbons.

8. The process of claim 1, wherein said apolar polymerization medium is selected from saturated $C_4$ hydrocarbons, unsaturated $C_4$ hydrocarbons, and mixtures thereof.

9. The process of claim 1, wherein said isobutene or isobutene-containing feedstock is selected from pure isobutene; a $C_4$ refinery cut containing between about 20-50% isobutene, between 5% and about 50% butene-1, between about 2% and about 40% butene-2, between about 2% and about 60% iso-butane, between about 2% and about 20% n-butane, and up to about 0.5% butadiene, wherein all percentages are by mass, based on the total mass of the $C_4$ refinery cut; and mixtures of pure isobutene and said $C_4$ refinery cut.

10. The process of claim 1, wherein molar ratio of Lewis acid to Lewis base in said Lewis acid.Lewis base complex is from about 0.9:1 to about 1:8.

11. The process of claim 1, wherein said complex is contacted with said isobutene or isobutene-containing feedstock at a concentration of millimoles of Lewis acid.Lewis base complex per liter of feedstock of from about 0.2 mM to about 200 mM.

12. The process of claim 10, wherein said complex is contacted with said isobutene or isobutene-containing feedstock at a concentration of millimoles of Lewis acid.Lewis base complex per liter of feedstock of from about 0.2 mM to about 200 mM.

13. The process of claim 1, wherein polymerization is conducted in the presence of a tertiary alcohol.

14. The process of claim 11, wherein said tertiary alcohol is selected from the group consisting of t-butanol, t-amyl alcohol and 3-ethyl 3-pentanol.

15. The process of claim 14, wherein said tertiary alcohol is t-butanol.

16. The process of claim 12, wherein polymerization is conducted in the presence of from about 0.05 mM to about 3 mM tertiary alcohol per liter of feedstock.

17. The process of claim 12, wherein polymerization is conducted in the presence of a concentration of tertiary alcohol that is from about 0.5% to about 30% of the Lewis acid.Lewis base complex concentration.

18. The process of claim 13, wherein polymerization is conducted in the presence of from about 0.05 mM to about 3 mM tertiary alcohol per liter of feedstock.

19. The process of claim 13, wherein polymerization is conducted in the presence of a concentration of tertiary alcohol that is from about 0.5% to about 30% of the Lewis acid.Lewis base complex concentration.

20. The process of claim 1, wherein polymerization is conducted in the presence of hindered alkoxyaluminum dichloride.

21. The process of claim 20, wherein said hindered alkoxyaluminum dichloride is t-BuOAlCl$_2$.

22. The process of claim 20, wherein polymerization is conducted in the presence of from about 0.05 mM to about 10 mM alkoxyaluminum dichloride per liter of feedstock.

23. The process of claim 21, wherein polymerization is conducted in the presence of from about 0.05 mM to about 10 mM t-BuOAlCl$_2$ per liter of feedstock.

24. The process of claim 1, wherein the polymerization process is conducted continuously.

25. The process of claim 1, wherein said polybutene product has an exo-olefin content of at least 70 mol. %.

26. The process of claim 1, wherein said polybutene product has a number average molecular weight (Mn) of from about 400 Daltons to about 4000 Daltons.

* * * * *